United States Patent
Eimer

(10) Patent No.: US 6,401,770 B1
(45) Date of Patent: Jun. 11, 2002

(54) DRAINAGE DIVERTER FOR VEHICLE WASTE FLUIDS

(76) Inventor: Robert L. Eimer, 3006 S. Sheridan Blvd., Denver, CO (US) 80227

( * ) Notice: Subject to any disclaimer, the term of this patent is extended or adjusted under 35 U.S.C. 154(b) by 0 days.

(21) Appl. No.: 09/654,374

(22) Filed: Sep. 1, 2000

Related U.S. Application Data

(60) Provisional application No. 60/170,913, filed on Dec. 15, 1999, now abandoned.

(51) Int. Cl.⁷ .................................................. B65B 1/04
(52) U.S. Cl. ..................... 141/86; 141/311 A; 141/340; 141/341
(58) Field of Search ......................... 141/86, 340, 341, 141/311 A, 65, 98, 106; 184/1.5, 106

(56) References Cited

U.S. PATENT DOCUMENTS

| | | | |
|---|---|---|---|
| 1,636,789 A | * | 7/1927 | Sigley |
| 4,084,655 A | * | 4/1978 | Savron ........................ 184/106 |
| 5,620,018 A | * | 4/1997 | Carpenter et al. .......... 141/114 |
| 5,803,140 A | * | 9/1998 | Jodoin .......................... 141/98 |
| 5,819,819 A | * | 10/1998 | Stanley ......................... 141/86 |
| 5,857,503 A | * | 1/1999 | Vreeken ...................... 141/340 |
| 5,967,200 A | * | 10/1999 | Hall ........................ 141/311 A |

* cited by examiner

Primary Examiner—Steven O. Douglas
Assistant Examiner—Khoa Huynh
(74) Attorney, Agent, or Firm—Ramon L. Pizarro; Edwin H. Crabtree

(57) ABSTRACT

A fluid shielding and collection tool for use in temporarily protecting a vehicle's components while maintaining the vehicle. The shielding and collecting tool includes a collecting planar surface, the collecting planar having a raised border and a downspout extending from the raised border. Additionally, a mounting mechanism adapted for mounting on the vehicle's components to be shielded and to support the collecting planar surface at the needed orientation to cause the fluids to be collected and diverted towards a final collecting device is attached to the device to support the planar surface.

11 Claims, 3 Drawing Sheets

DRAINAGE DIVERTER FOR VEHICLE WASTE FLUIDS

REFERENCE TO RELATED APPLICATIONS

This application claims the benefit of my provisional application having Ser. No. 60/170,913, filed Dec. 15, 1999, now abandoned.

BACKGROUND OF THE INVENTION (a) Field of the Invention

This invention generally relates to a device for collecting and draining waste fluids, such as used oil, from vehicles as these waste fluids are drained from the vehicle. More particularly, but not by way of limitation, to a device that mounts on a vehicle axle or other structure to collect, shield, and re-direct the flow of these fluids to be collected in another container.

(b) Discussion of Known Art

Motor vehicles such as cars, full-size light duty trucks and sport utility vehicles, as well as other trucks require routine maintenance to ensure the longevity and reliability of the components of the vehicle. This maintenance includes the changing of fluids, such as engine oil, coolant, brake fluid, and other oils or liquids. Unfortunately, however, the design of the vehicle makes it very difficult to change these fluids without spillage of the fluids onto components of the vehicle. For example, popular versions of a four wheel drive light duty truck manufactured by the General Motors Corporation has a drive shaft that extends from the vehicle's transfer case to the front axle, and which extends below the engine oil filter, which is mounted horizontally to clear the drive-shaft. Thus, when changing the oil filter, an amount of oil is inevitably spilled onto the drive shaft. The presence of oil on the drive shaft is unsightly, and leads to the accumulation of dirt and other debris on the drive shaft.

Commercially available funnels and other drainage collection tools do not offer the needed stability and convenience of use in gathering fluids where access to the source of the fluid is obstructed. Thus, technicians often dispense with the attempt to use these tools and simply let the surrounding components get soiled by the fluids.

Thus, there remains a need for a device that is easy to use and which cooperates with other known tools to help the technician collect the used fluids as they are being drained from the vehicle, and which shield the vehicle's components from this fluid as it is being drained.

Still further, there remains a need for a device that can be mounted on the component to be protected, and which protects that component from the waste fluid as it is drained.

SUMMARY

It has been discovered that the problems left unanswered by known art can be solved by providing a fluid shielding and collection tool, which includes:

- a collecting planar surface, the collecting planar surface having a raised border and a downspout extending from the raised border; and
- an attachment or gripping device used to grip the vehicle's components to be shielded and to support the collecting planar surface at the needed orientation to cause the fluids to be collected and diverted towards a final collecting device, such as a drain pan.

According to a highly preferred embodiment of the invention the planar area consists of a flat surface with a perimeter which terminate in a raised rounded brim or lip. An edge of the planar area extends into a runoff duct or spill way that extends down and away from the planar area or surface. The brim or lip of the planar area follows the spill way, bounding the spill way towards a spill way exit.

In a highly preferred embodiment it is further contemplated that the means or attachment or gripping device used to grip the vehicle's components to be shielded consists of a pair of spaced apart tabs. The tabs mount against the component to be shielded and stabilize the planar surface to ensure that fluids collected on the planar surface are permitted to flow towards the spill way.

Still further, it is contemplated that the spaced apart tabs and a portion of the invention used to define the planar surface define a generally rectangular enclosure which is particularly well suited for mounting over the yokes of a universal joint. Thus, this embodiment allows resting of the device over a universal joint on a shaft to ensure protection of the joint from fluids falling from above.

It is important to note, however, that it is contemplated that the planar surface may be supported by other means, such as adjustable arms or clamps that position the planar surface over the components to be protected.

It should also be understood that while the above and other advantages and results of the present invention will become apparent to those skilled in the art from the following detailed description and accompanying drawings, showing the contemplated novel construction, combinations and elements as herein described, and more particularly defined by the appended claims, it should be clearly understood that changes in the precise embodiments of the herein disclosed invention are meant to be included within the scope of the claims, except insofar as they may be precluded by the prior art.

DRAWINGS

The accompanying drawings illustrate preferred embodiments of the present invention according to the best mode presently devised for making and using the instant invention, and in which.

DETAILED DESCRIPTION OF PREFERRED EXEMPLAR EMBODIMENTS

While the invention will be described and disclosed here in connection with certain preferred embodiments, the description is not intended to limit the invention to the specific embodiments shown and described here, but rather the invention is intended to cover all alternative embodiments and modifications that fall within the spirit and scope of the invention as defined by the claims included herein as well as any equivalents of the disclosed and claimed invention.

Figure 1:
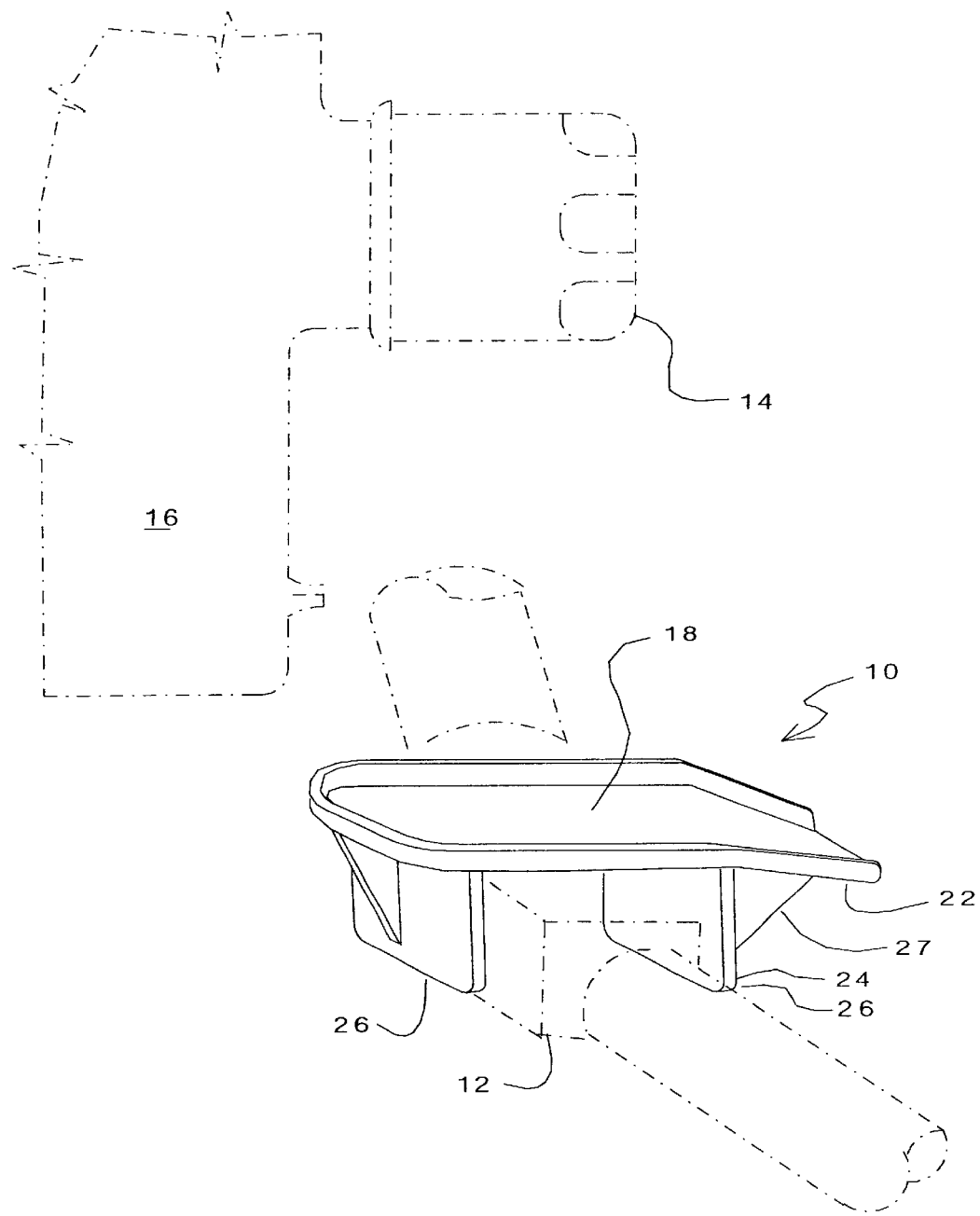
FIG. 1 is a perspective view of an embodiment of the invention mounted over a universal joint.

Turning now to FIG. 1 where a fluid shielding and collection tool 10 made in accordance with the principles taught herein is shown. The shielding and collecting tool 10 is shown in use while mounted over a universal joint 12. The illustrated arrangement would be typical of what is found in many four wheel trucks or sports-utility vehicles manufactured by the General Motors Corporation. In these vehicles the universal joint 12 is found below the oil filter connector 14 on the engine 16. The oil filter connector 14 holds an oil filter horizontally over the drive shaft components such as the universal joint 12. Thus, when replacing the oil filter, it is almost inevitable that used oil will fall towards the universal joint 12.

Figure 2:
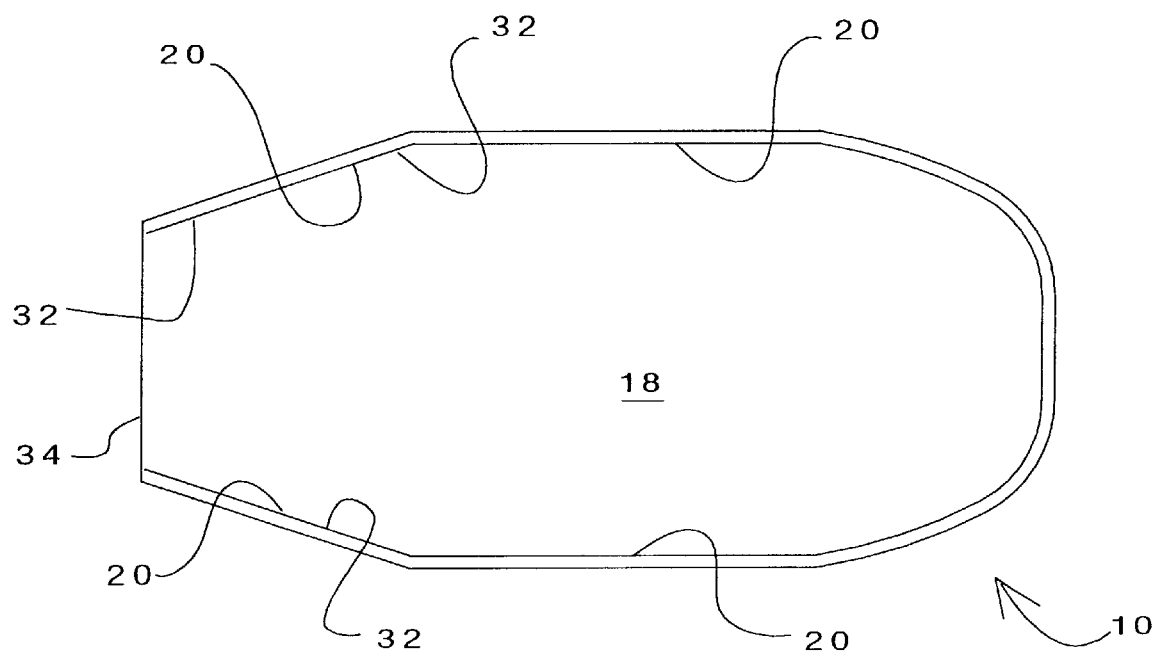
FIG. 2 is a top, plan view of the planar area and the transition into the spill way of the invention.

Referring now to FIGS. 1 and 2 it will be understood that the shielding and collection tool 10 includes a collecting planar surface 18, the collecting planar surface 18 includes a raised border 20 and a downspout 22 that extends from the raised border 20 to a level below and away from the collecting planar surface 18. It is important to note that the disclosed invention provides a relatively wide collecting planar surface 18 which can catch the falling fluid as well as any splatter or movements in the falling stream caused by the change in pressure forcing the stream of fluid from the engine 16 or vehicle. The raised border 20 restrains and guides the flow of the fluid towards the downspout 22, where it flows away from the structure or mechanical component being protected and towards a final collection funnel or bin.

Figure 3:
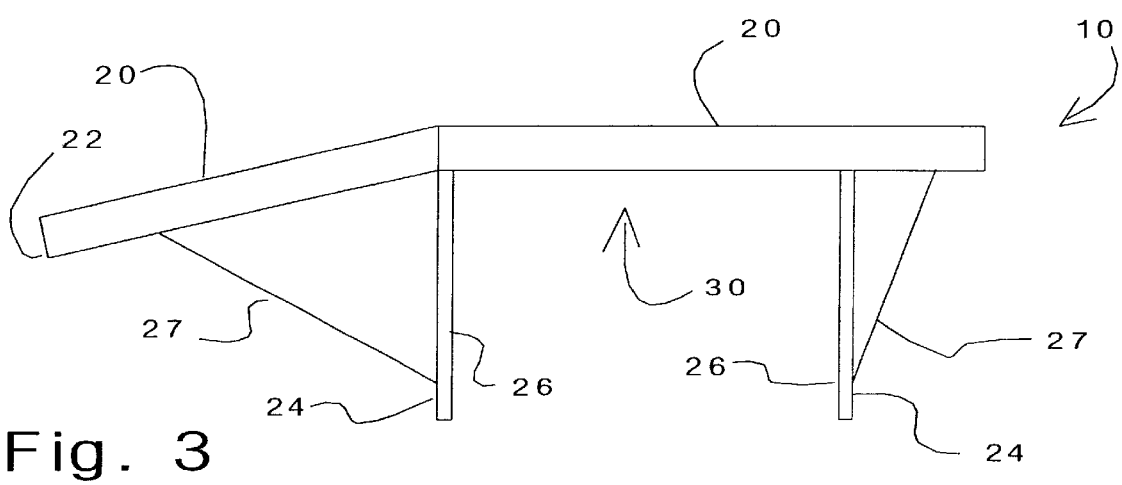
FIG. 3 is a side view of the invention. The view illustrating the tabs and gussets used to attach the tabs.
Figure 4:
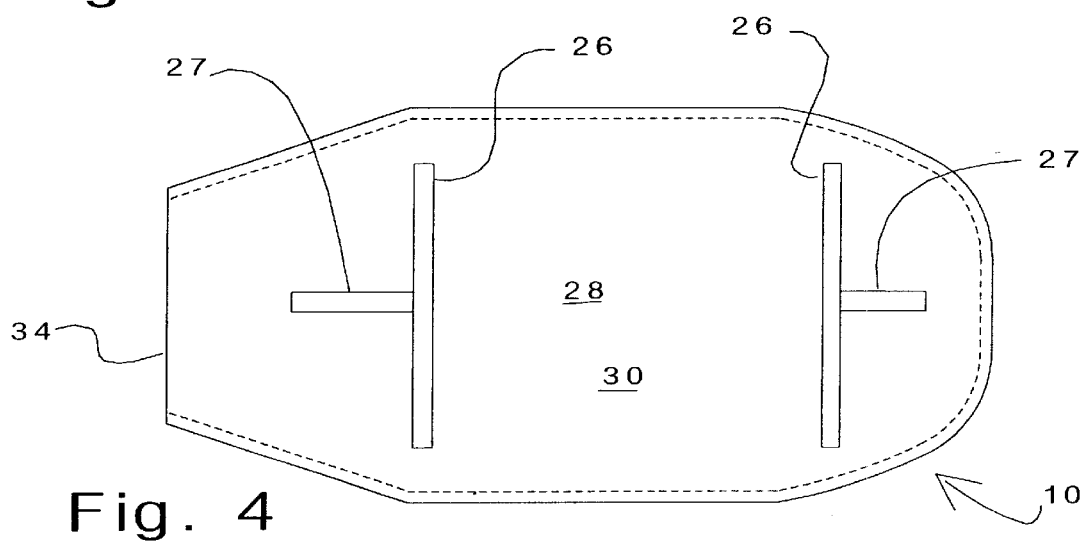
FIG. 4 is a bottom view of the highly preferred embodiment of the invention.

As shown on FIGS. 1 and 3, the stability of the shielding and collection 10 over the vehicle component being protected is provided by a mounting means 24 which have been adapted for mounting on the vehicle's components to be shielded. In the highly preferred embodiment illustrated in the enclosed figures, the mounting means 24 includes a pair of opposing tabs 26 that extend from below the structure supporting the collecting planar surface 18 to a distance that allows gripping of the component being shielded. The illustrated tabs 26 include gussets 27 that strengthen and stiffen the tabs 26. Of course, it is contemplated that other clamps, clips, spring loaded or magnetic connectors or supports may also be used as the mounting means 24. However, in the highly preferred embodiment of the invention the tabs 26 together with the base 28 or supporting structure below the collecting planar surface 18 cooperates with the tabs to produce a saddle or nesting structure that has been adapted for mounting over the yoke of a universal joint and cooperating with the yoke to provide a stable support for the shielding collecting tool 10. Thus, as shown on FIG. 4, the base 28 is generally flat and the tabs 26 extend from the base 28 to define the saddle portion 30, and to support the collecting planar surface 18 at the needed orientation to cause the fluids to be collected and diverted towards a final collecting device.

Figure 5:
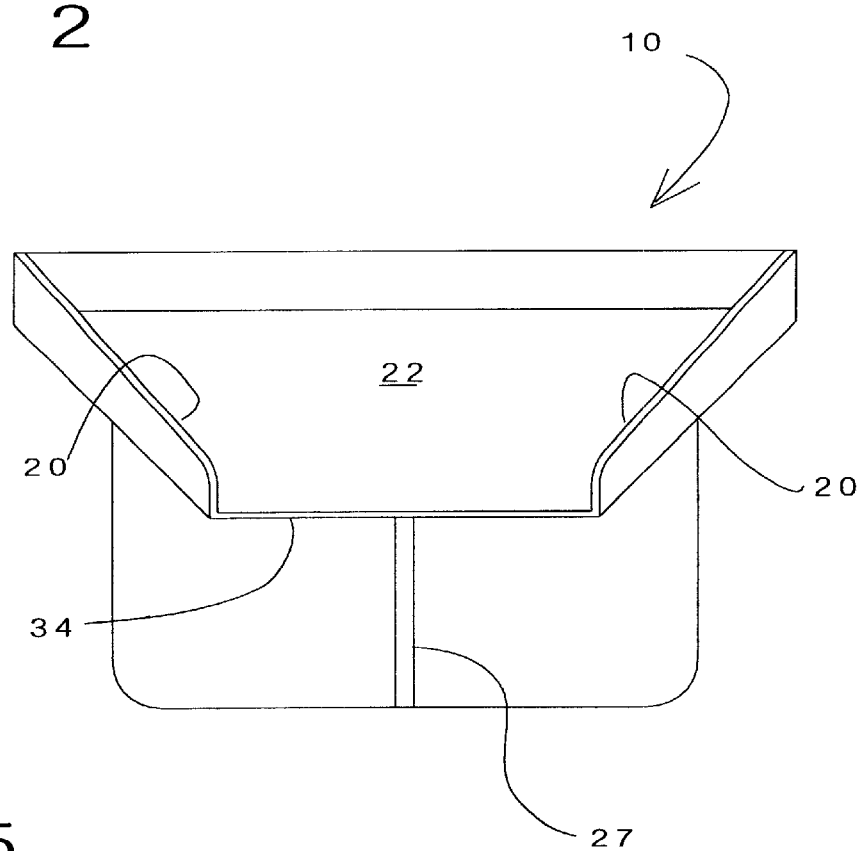
FIG. 5 is an end view of the invention, the view illustrating the relation of the spill way and the planar surface.
Figure 6:
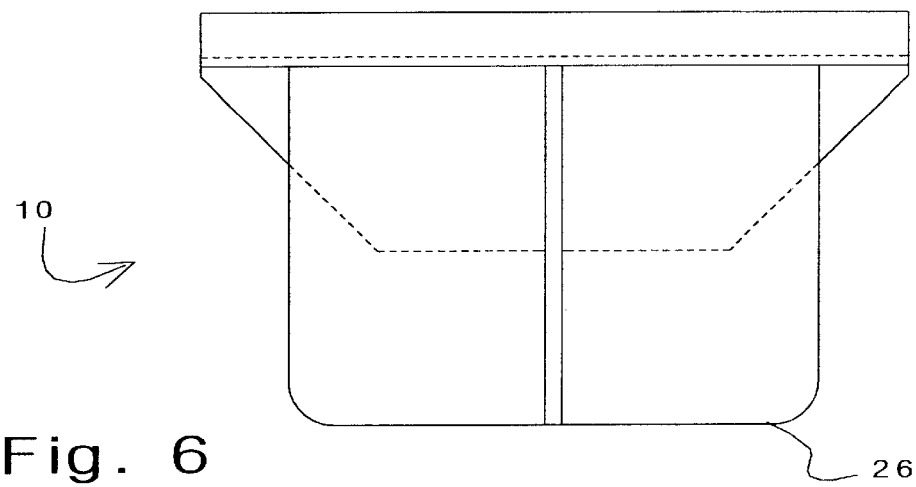
FIG. 6 is a rear view of the view illustrated in FIG. 5, and illustrates the relationship between the planar surface and the tabs and gussets.

Referring now to FIGS. 5 and 6, it will be understood that a preferred embodiment of the downspout 22 extends downward and away from the collecting planar surface 18, away from the tabs 26. The raised border 20 that surrounds the collecting planar surface 18 follows the edges 32 of the downspout 22 towards a discharge edge 34 of the downspout 22. Of course, it is contemplated that the downspout 22 may be a duct or tube, and that the raised border 20 may simply surround the collecting planar surface and include a drainage nipple or valve to which a drainage duct may be attached.

Thus it can be appreciated that the above described embodiments are illustrative of just a few of the numerous variations of arrangements of the disclosed elements used to carry out the disclosed invention. Moreover, while the invention has been particularly shown, described and illustrated in detail with reference to preferred embodiments and modifications thereof, it should be understood that the foregoing and other modifications are exemplary only, and that equivalent changes in form and detail may be made without departing from the true spirit and scope of the invention as claimed, except as precluded by the prior art.

What is claimed is:

1. A fluid shielding and collection tool for use in temporarily protecting at least one component in a vehicle while draining a fluid from the vehicle, the shielding and collecting tool comprising:

a base having a collecting planar surface, the collecting planar surface having a raised border and a downspout extending from the raised border; and a pair of spaced apart tabs extending from said base at a location below the collecting planar surface, the spaced apart tabs cooperating with the base for grasping the component to be shielded by extending next to the component to be shielded, so the component to be shielded is held between the spaced apart tabs, below the collecting planar surface.

2. A tool according to claim 1 wherein said spaced apart tabs and said base are of unitary, one-piece construction.

3. A tool according to claim 1 wherein said spaced apart tabs are of a resilient material and are spaced apart such that the component to be shielded nests between the spaced apart tabs and the base.

4. A tool according to claim 1 wherein said planar surface is generally flat and said raised border is connected to said downspout, so that the fluid collected over said collecting planar surface is retained by said raised border before flowing into the downspout.

5. A fluid shielding and collection tool for use in temporarily protecting at least one component in a vehicle while draining a fluid from the vehicle, the shielding and collecting tool comprising:

a base having a collecting planar surface, the collecting planar surface having a raised border and a downspout extending from the raised border; and a pair of resilient spaced apart tabs adapted for engaging the component between the resilient spaced apart tabs, the resilient spaced apart tabs extending from said base, away from the collecting planar surface at a location below the collecting planar surface, the spaced apart tabs cooperating with the base for grasping the component to be shielded by extending next to the component to be shielded, so the component to be shielded is held between the spaced apart tabs, below the collecting planar surface.

6. A tool according to claim 5 wherein said spaced apart tabs and said base are of unitary, one-piece construction.

7. A tool according to claim 6 wherein said planar surface is generally flat and said raised border is connected to said downspout, so that the fluid collected over said collecting planar surface is retained by said raised border before flowing into the downspout.

8. A tool according to claim 5 wherein said spaced apart tabs are of a resilient material and are spaced apart such that the component to be shielded nests between the spaced apart tabs and the base.

9. A method for temporarily shielding, collecting, and diverting a flow of a fluid as the fluid is being drained from a vehicle drainage point for the purpose of maintaining the vehicle, the method comprising:

providing a fluid shielding and collection tool for use in temporarily protecting at least one component in a vehicle while draining a fluid from the vehicle, the shielding and collecting tool comprising:

a base having a collecting planar surface, the collecting planar surface having a raised border and a downspout extending from the raised border; and a pair of resilient spaced apart tabs adapted for engaging the component between the resilient spaced apart tabs, the resilient spaced apart tabs extending from said base, away from the collecting planar surface at a location below the collecting planar surface, the spaced apart tabs cooperating with the base for grasping the component to be shielded by extending next to the component to be shielded, engaing the component to be shielded is held between the spaced apart tabs; and releasing the flow of fluid, so that the flow of fluid falls on the collecting planar surface.

10. A method according to claim 9 wherein said tool includes spaced apart tabs and said base are of unitary, one-piece construction.

11. A method according to claim 9 wherein said spaced apart tabs are of a resilient material and are spaced apart such that the component to be shielded nests between the spaced apart tabs and the base.

* * * * *